(12) United States Patent
Becker et al.

(10) Patent No.: US 9,937,576 B2
(45) Date of Patent: Apr. 10, 2018

(54) METHOD AND SYSTEM FOR WELDING CONDUITS

(71) Applicant: ARVOS TECHNOLOGY LIMITED, Brugg (CH)

(72) Inventors: Ari Becker, Fuldabrück (DE); Andreas Bresinski, Schöningen (DE)

(73) Assignee: ARVOS GmbH, Kassel (DE)

( * ) Notice: Subject to any disclaimer, the term of this patent is extended or adjusted under 35 U.S.C. 154(b) by 52 days.

(21) Appl. No.: 14/963,472

(22) Filed: Dec. 9, 2015

(65) Prior Publication Data

US 2016/0089742 A1 Mar. 31, 2016

Related U.S. Application Data

(62) Division of application No. 13/958,825, filed on Aug. 5, 2013, now abandoned.

(30) Foreign Application Priority Data

Aug. 8, 2012 (EP) .................................... 12179757

(51) Int. Cl.
| | |
|---|---|
| *B23K 9/035* | (2006.01) |
| *B23K 9/028* | (2006.01) |
| *B23K 31/02* | (2006.01) |
| *B23K 37/053* | (2006.01) |

(52) U.S. Cl.
CPC .......... *B23K 9/0286* (2013.01); *B23K 9/0282* (2013.01); *B23K 9/035* (2013.01); *B23K 31/027* (2013.01); *B23K 37/053* (2013.01)

(58) Field of Classification Search
None
See application file for complete search history.

(56) References Cited

U.S. PATENT DOCUMENTS

| | | | | |
|---|---|---|---|---|
| 3,365,566 A | * | 1/1968 | Kuder | .................... B23K 9/035 |
| | | | | 219/160 |
| 3,432,915 A | * | 3/1969 | Doyle | .................. B23K 9/0282 |
| | | | | 219/160 |
| 3,460,736 A | | 8/1969 | Cadle et al. | |
| 3,777,103 A | | 12/1973 | White et al. | |

(Continued)

FOREIGN PATENT DOCUMENTS

DE 9408861 U1 9/1994

OTHER PUBLICATIONS

O'Brien, Welding Handbook, American Welding Society, vol. 2, 2004, p. 84.*

*Primary Examiner* — Devang R Patel
(74) *Attorney, Agent, or Firm* — Murtha Cullina LLP

(57) ABSTRACT

A method for welding two or more conduits includes aligning end portions thereof in an abutting relationship to define a gap. The method includes performing a spatter free root weld along the gap to configure a root layer while the inner circumferential surface side is unobstructed. After the root weld is complete, an outward thrust is applied along the inner circumferential surfaces of the conduits. During the application of the outward thrust, a filler weld is performed along the gap to fill the gap and to facilitate shrinkage of the filler and root weld materials longitudinally and radially outward while preventing pressing out of the filler and root weld materials radially inward of the inner circumferential surface.

9 Claims, 3 Drawing Sheets

(56) References Cited

U.S. PATENT DOCUMENTS

| | | | |
|---|---|---|---|
| 3,922,517 A * | 11/1975 | Nelson | B23K 9/0286 219/137 R |
| 4,182,951 A * | 1/1980 | Kuder | B23K 9/0356 219/160 |
| 4,556,162 A | 12/1985 | Gwin et al. | |
| 5,304,776 A | 4/1994 | Buerkel et al. | |
| 5,395,142 A * | 3/1995 | Horn | B23K 37/0531 228/50 |
| 6,637,640 B1 * | 10/2003 | Sennett | B23K 9/325 228/17 |
| 8,373,083 B2 | 2/2013 | Keitel et al. | |
| 2008/0083705 A1 | 4/2008 | Peters | |
| 2010/0159625 A1 | 6/2010 | Lee | |
| 2010/0281688 A1 | 11/2010 | Keller et al. | |
| 2011/0094613 A1 | 4/2011 | Rosen | |

\* cited by examiner

METHOD AND SYSTEM FOR WELDING CONDUITS

CROSS-REFERENCE TO RELATED APPLICATIONS

This application is a divisional application of, and claims priority to, U.S. patent application Ser. No. 13/958,825, filed Aug. 5, 2013, which claims priority to European Application 12179757.5 filed Aug. 8, 2012, the contents of which are hereby incorporated in its entirety.

TECHNICAL FIELD

The present disclosure relates to welding technology, and, more particularly, to a method and a system for welding two or more conduits.

BACKGROUND

Pieces of conduits, such as pipes or tubes, are welded together circumferentially to configure a required conduit length for being utilized in various purposes, including but not limited to, in heat exchangers or as transportation pipe lines, generally, utilized in various industries for the transportation of the chemicals, mineral oil and natural gases, and the like. Welding the pieces of conduits with each other requires much care, time and skill so that it is extraordinarily expensive. In welding the pieces of conduits there are great chances of deposition of weld material in and around a welding zone. Deposition of the weld material along the inner surfaces of the conduits may reduce the life of the welded conduits due to corrosions that may arise due to particles in the travelling through the welded conduits. Many attempts have been made to obviate such problems, and are still being made.

Generally, the welding of such conduit pieces is two steps process. In the first step, a base weld, generally known as a root layer, is made between the pieces of conduits in a relatively small gap, generally known as a root gap, therebetween. Base weld or the root layer is made at part of wall thickness adjacent to the inner surfaces of the conduit pieces. While forming the root layer there are great chances of the weld material to travel across the inner surfaces and get deposited. However, various modern technology are nowadays available which may prevent the deposition of the excess weld material, such as providing backing rings etc., along the welding zone. Such backing rings are provided on the inner surfaces along the root gap as a support, and thereafter the base weld is conducted. Such backing ring prevents the root weld of the root layer to travel across the inner surfaces of the conduit pieces in turn preventing weld material deposition thereon. Since the backing ring is partially melted, it has to be removed afterwards by machining.

Further, the second welding step is performed. In this step the root gap, after forming of the root layer, is filled by performing filler weld. The 'root gap' after forming of the root layer technically hereinafter referred to as a 'gap.' This gap is filled by repeatedly depositing filler weld electrodes. While performing the filler weld there are very likely chances of the root layer obtained in the first step of getting pressed out due the heat transfer effect of the filler weld. Generally, while performing the filler weld, compression stress on the root weld may be created, and therefore, there are likely chances that the root layer may plastically deform, which may lead to pressing out of the weld materials, such as the root weld or filler weld materials. Such pressing out of the weld material may reduce the life of the welded conduits due to corrosions as mentioned. Therefore in order to reduce such chances, generally machining of the deposited weld material are done wherein the excess root material are removed by machining manually or by utilizing any automatic device. Such machining is time consuming and cumbersome process that requires a lot of hands in turn increasing the costing over all of the welded conduits.

Accordingly, there exists a need of time effective, economic and handy ways for preventing deposition of the root weld in and around the welding zone of the conduit's inner surfaces, which precludes the required machining to remove the deposited root weld.

SUMMARY

In view of the forgoing disadvantages inherent in the prior-art, the present disclosure provides method and system for welding conduits. Such method and system is configured to include all advantages of the prior art, and to overcome the drawbacks inherent in the prior art and provide some additional advantages.

An object of the present disclosure is to provide time effective, economic and handy ways for preventing deposition of weld material in and around welding zone of the conduit's inner surfaces while welding the conduits.

Another object of the present disclosure is to preclude the requirement of machining to remove deposited weld materials.

To achieve the above objects, in an aspect of the present disclosure, a method for welding two or more conduit members is provided. The method comprising:

aligning two or more end portions of the two or more conduit members in an abutting relationship to define a gap, the conduit members having outer and inner opposite circumferential surfaces sides;

performing a root weld along the gap from the outer circumferential surfaces side to configure a root layer, in a manner that prevents spattering of the root weld material along the inner circumferential surfaces side;

applying an outward thrust, along the inner circumferential surfaces side; and performing a filler weld along the gap from the outer circumferential surfaces side thereof to fill the gap, performances of the filler weld upon the application of the outward thrust ensures shrinkage of the filler and root weld materials longitudinally and radially outward, across the two or more conduit members, preventing pressing out of the filler and root weld materials along the inner circumferential surfaces side while performing the filler weld.

In one embodiment of the above aspect the method further comprising preparing edges of the two or more end portions of the two or more conduit members for performing the root weld.

In one embodiment of the above aspect applying the outward thrust further comprises, providing a support member along the inner circumferential surfaces side; and actuating the support member to expand diametrically along the inner circumferential surfaces of the two or more conduits for applying the outward thrust.

In one embodiment of the above aspect, the method comprising releasing the outward thrust upon solidifying of the filler and root weld materials.

In one embodiment, the support member is actuated and released by utilizing one of a hydraulically, a pneumatically, a mechanically or a thermally actuating arrangement.

In another aspect of the present disclosure, a system for welding two or more conduit members is provided. The system comprises:

a root welding tool to root weld a gap to form a root layer in the gap configured along two or more end portions of the two or more conduit members aligned in an abutting relationship, from an outer circumferential surfaces side, opposite to an inner circumferential surfaces side, of the two or more conduit members, the root weld performed in a manner that prevents spattering of the root weld material along the inner circumferential surfaces side;

a filler welding tool to filler weld the gap from the outer circumferential surfaces side to fill the gap; and a support member provided along the inner circumferential surfaces side for applying an outward thrust therealong to ensure shrinkage of the filler and root weld materials longitudinally and radially outward, across the two or more conduit members, thereby preventing pressing out of the filler and root weld materials along the inner circumferential surfaces while performing the filler weld.

In one embodiment of the above aspect, the system further comprises an edge preparation tool for preparing edges of the two or more end portions of the two or more conduit members to perform the root weld.

In one embodiment of the above aspect, the support member comprises, an actuating arrangement capable of being actuated to expand diametrically along the inner circumferential surfaces of the two or more conduits for applying the outward thrust; and a releasing arrangement configured in conjunction with the actuating arrangement, the releasing arrangement capable of releasing the outward thrust upon solidifying of the filler and root weld materials.

In one embodiment, the actuating and the releasing arrangements of the support member are one of a hydraulically, a pneumatically, a mechanically or a thermally operated arrangements.

The above aspects of the present disclosure are capable providing time effective, economic and handy ways for preventing deposition of weld material in and around welding zone of the two or more conduit's inner surfaces while welding and thereafter. Specifically, the support member of the present disclosure is provided to prevent the deposition of the weld materials which in turn precludes the requirement of machining. The support member is provided along the inner circumferential surfaces side for applying the outward thrust therealong to ensure shrinkage of the filler and root weld materials longitudinally and radially outward, across the two or more conduit members. This prevents pressing out of the filler and root weld materials along the inner circumferential surfaces while performing the filler weld, and till solidifying of the weld material. Further, the outward thrusts provided by the support member also manage to ensure the stress development across the two or more conduit members in longitudinally and radially outward direction. This enables the durability of the weld and prevents any type of cracking in the weld while and after its formation.

The term 'welding zone' used herein is a zone where the welding, such as the root weld or the filler weld is performed. The welding zone is in and around the gap.

The terms 'inner circumferential surfaces side', and 'outer circumferential surfaces side' respectively, used herein refer to, inner side of the conduits or inner surfaces of the conduits, and outer side of the conduits or outer surfaces of conduits.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. Further, the term "one embodiment," "another embodiment," "various embodiments," and the like used herein is for the purpose of description and should not be regarded as limiting to the particular embodiment.

The term "first," "second," "inner," "outer" and the like, herein do not denote any order, elevation or importance, but rather are used to distinguish one element over another. Further, the terms "a," "an," and "plurality" herein do not denote a limitation of quantity, but rather denote the presence of at least one of the referenced item.

Figure 1:
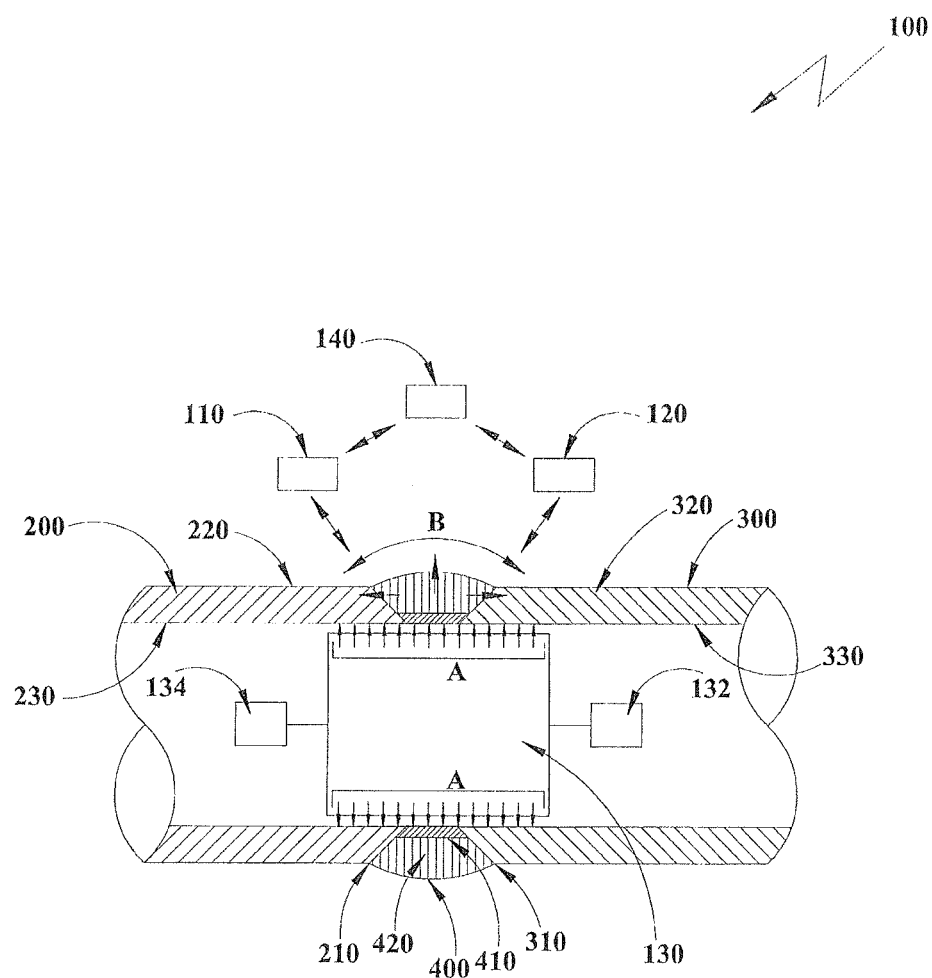
FIG. 1 illustrates a block diagram of a system for welding two or more conduits, in accordance with an exemplary embodiment of the present disclosure.
Figure 2A:
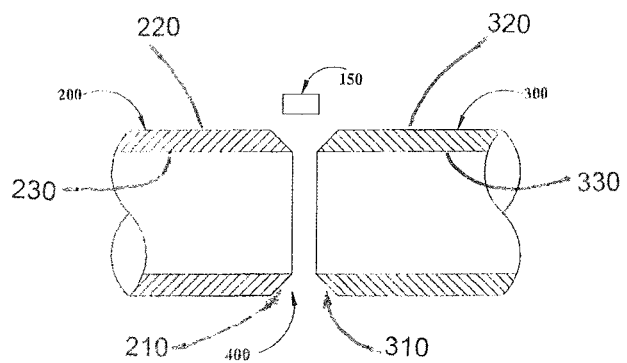
FIGS. 2A to 2D illustrate block diagrams depicting welding of the two or more conduits, in accordance with an exemplary embodiment of the present disclosure.

Referring now to FIG. 1 and FIGS. 2A to 2O, depicting a system 100, for welding two or more conduits, in accordance with various exemplary embodiments of the present disclosure are illustrated. The system 100 includes a root welding tool 110, a filler welding tool 120 and a support member 130 utilized for creating an environment for welding two or more conduits. For the purpose of description of the present embodiment of the disclosure two conduit members, such as a first conduit member 200 and a second conduit member 300, (hereinafter also referred to as conduits 200 and 300) are illustrated in FIG. 1, without limiting its scope to include any required numbers of the conduits.

Figure 2B:
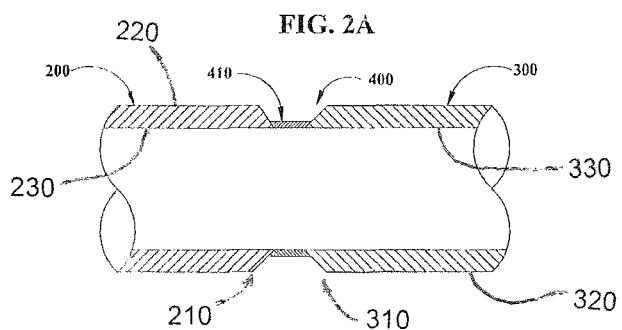
Figure 2C:
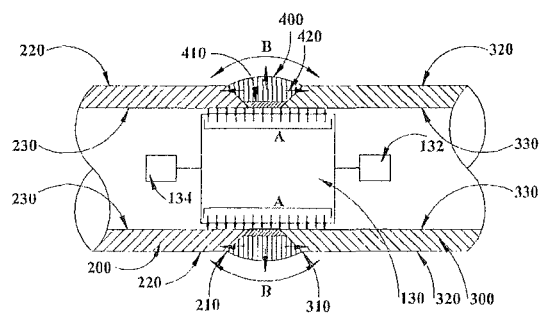
Figure 2D:
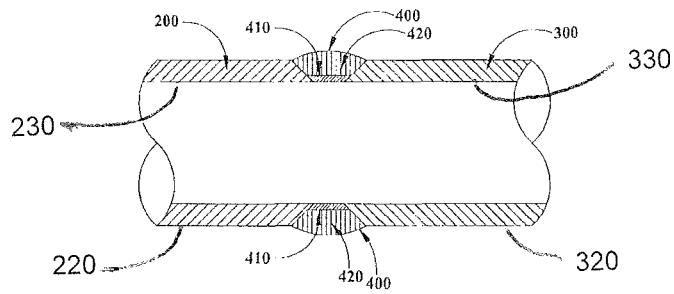

As shown in FIG. 2A, the first and second conduits 200 and 300 are aligned in an abutting relationship, at a predetermined distance, to one another for a butt type of welding without a backing ring. Specifically, an end portion 210 of the conduit 200 and an end portion 310 of the conduit 300 are aligned in a manner facing each other. The conduits 200 and 300, respectively, include outer circumferential surfaces 220 and 320 (referred to as outer surfaces side 220, 320), and inner circumferential surfaces 230 and 330 (referred to as—inner surfaces side 230, 330) opposite to each other. As shown in FIGS. 2A and 2B during the root welding, the inner ring surface sides 230 and 330 are free of any obstructions such as a backing ring. The conduits 200 and 300 may be coupled to a clamping, driving and holding devices, as known in the art. Such devices engage the conduits 200 and 300, either from the outer surfaces side 220, 320 or from the inner surfaces side 230, 330 thereof, to drive thereto towards each other, such that respective end portions 210 and 310 faces each other. In one embodiment, the edges of the end portions 210 and 310 are prepared, such as chamfered or beveled, in opposite directions to complement each other, prior to aligning the conduits 200 and 300. Such preparation of the end portions 210 and 310 configures to a gap 400 between the end portions 210 and 310 of the two adjacent conduits 200 and 300. The edges preparation may be performed as per the requirement of the conduits 200 and 300 to configure the gap 400 of shapes including, but not limited to, V-shape, J-shape, and the like, by utilizing an edge preparation tool 150, such as chamfering tools, as illustrated in FIG. 2A. Such edge preparation of the conduits 200, 300 defines a root gap along the gap 400 near to the inner circumferential surfaces 230, 330 of the conduits 200, 300. Such devices, upon making contact with the conduits 200 and 300, bind movements towards each other to lock thereto in a position to prevent one conduit from separating or moving back away from other conduit. The clamps which grasp the conduits 200 and 300 may be designed to grasp thereto from the outer surfaces sides 220, 320 or from the inner surfaces side 230, 330, whichever is most convenient.

Further, in the system 100, the root welding tool 110 is configured to root weld the gap 400 to form a root layer 410 in the root gap 400. The 'gap 400' before forming of the 'root layer 410' technically defines the root gap, as it is generally referred in the technical filed of conduits welding, wherein the root layer 410 is formed, and may also hereinafter refer to as a 'root gap 400,' to distinguish the welding process. The root welding tool 110 may be electrically actuated and controlled to perform its desired purpose via utilizing an electrical control panel 140. However, the provision of having the electrical control panel 140 in the system 100 does not exclude the scopes of enabling the entire welding process manually. The root welding tool 110 includes welding arrangements that is capable of holding and processing electrodes, for example bare or uncoated electrodes, for forming the root layer 410 in the root gap 400. The root welding tool 110 with the electrodes is provided from the outer surfaces side 220, 320 of the conduits 200, 300 for depositing the molten electrode weld material within the root gap 400 for configure the root layer 410. The root weld for configuring the root layer 410 is performed without a backing ring and in a manner that prevents spattering of the root weld material along the inner surfaces side 230, 330 of the conduits 200, 300. The root layer, without spattering of the root weld material along the inner surfaces side 230, 330 of the conduits 200, 300, may be performed by using various modern technologies and process, such as automatic welding, gas tungsten arc welding, electronic beam welding and laser beam welding, etc.

Further, in the system 100, the filler welding tool 120 is configured to filler weld the gap 400, above the root layer 410, from the outer surfaces side 220, 320 of the conduits 200, 300 to fill the gap 400. The filler welding tool 120 may also be electrically actuated and controlled to perform its desired purpose via utilizing the electrical control panel 140, without departing the provision of enabling the entire welding process manually. The filler welding tool 120 includes welding arrangements that is capable of holding and processing filler electrodes, for example coated electrodes, for forming filler layers 420 in the gap 400. The root welding tool 110 with the filler electrodes is provided from the outer surfaces side 220, 320 of the conduits 200, 300 for depositing the molten filler electrode weld material within the gap 400. This process is repeated continuously until the gap 400 filled completely configuring the filler layers 420, and in turn welding the conduits 200, 300. The filler weld for configuring the filler layers 420 is performed in a manner that prevents pressing out of the weld materials along the inner surfaces side 230, 330 of the conduits 200, 300. Generally, while performing the filler weld, the filler layers 420 create compression stress on the root weld, and therefore, there are likely chances that the root layer 410 may plastically deform, which may lead to pressing out of the weld materials, such as the root weld or filler weld materials. This is where the present disclosure provides the most preferred embodiment to prevent such pressing out of the weld materials.

In the most preferred embodiment of the present disclosure, the support member 130 is provided. The support member 130 is inserted within the conduits 200, 300, for supporting the inner surfaces side 230, 330 thereof. The support member 130 is capable of applying an outward thrust (as shown by arrows set 'A') along the inner surfaces side 230, 330 to ensure shrinkage of the filler and root weld materials longitudinally and radially outward (as shown by arrow set 'B'), across the two or more conduits 200, 300. For example, the outward thrust may vary between about 100 bars to about 500 bars. However, without departing from the scope of the present disclosure, the support member 130 is capable of providing any required outward thrust upon the requirement. The support member 130 is capable of providing support during the filler weld process and until the solidifying of the complete weld material, which in turn prevent pressing out of the weld materials along the inner surfaces side 230, 330. In one form, the support member 130 may be inserted within the conduit 200, 300 and applies the outward thrust, prior to performing the filler welding process, i.e. after the root weld is finished. In other form, the support member 130 may also be inserted within the conduit 200, 300 and apply the outward thrust simultaneously while performing the filler welding process. Further, the outward thrusts provided by the support member 130 also manage to ensure the stress development across the conduits 200, 300 in longitudinally and radially outward direction (as 10 shown by arrow set 'B'). This enables the durability of the weld and prevents any type of cracking in the weld while and after its formation. The support member 130 may be electrically actuated and controlled to perform its desired purpose via utilizing the electrical control panel 140. However, the provision of having the electrical control panel 140 in the system 100 does not exclude the scopes of enabling the support member 130 manually.

In one embodiment of the present disclosure, the support member 130 may include an actuating arrangement 132 and an releasing arrangement 134 configured in conjunction to each other and with the support member 130 for enabling the application of the outward thrust, and releasing thereof. Upon inserting the support member 130 within the conduits 200, 300, the actuating arrangement 132 is capable of being actuated to expand diametrically the support member 130 along the inner surfaces 230, 330 of the conduits 200, 300. Such expansion exerts the outward thrust to ensure shrinkage of the filler and root weld materials longitudinally and radially outward from the inner surfaces side 230, 330, across the conduits 200, 300. This outward thrust prevents pressing out of the weld materials along inner surfaces side 230, 330. Once the filler welding is complete and the welded material is solidified, the 25 releasing arrangement 134 is capable of releasing the outward thrust. The actuating and releasing arrangements 132, 134 may be activated electrically by the help of the electrical control panel 140 or may be manually activated.

In various embodiments of the present disclosure, the support member 130 may be one of a hydraulically, a pneumatically, a mechanically or a thermally operated support member for enabling the application of the outward thrust, and releasing thereof. In various embodiments of the present disclosure, actuating and releasing arrangements 132, 134 may be one of a hydraulically, a pneumatically, a mechanically or a thermally operated arrangements for enabling the application of the outward thrust, and releasing thereof.

In hydraulic and pneumatic configurations, respectively, hydraulic and pneumatic forces are applied and released to provide the outward thrust with the help of the actuating and releasing arrangements 132, 134 in conjunction of the support member 130. Further, in mechanical configuration, the outward thrust may be applied by mechanically activating the actuating and releasing arrangements 132, 134 in conjunction to the support member 130. Furthermore, in thermal configuration, the outward thrust may be applied by thermally activating the actuating and releasing arrangements 132, 134 in conjunction of the support member 130.

Welding of the conduits 200, 300 by providing the support member 130 from the 'inside support surface' may develop stress in the welding zone, therefore, in order to release such stress in the cost effective manner, the post weld heat treating may be carried out afterwards.

Figure 3:
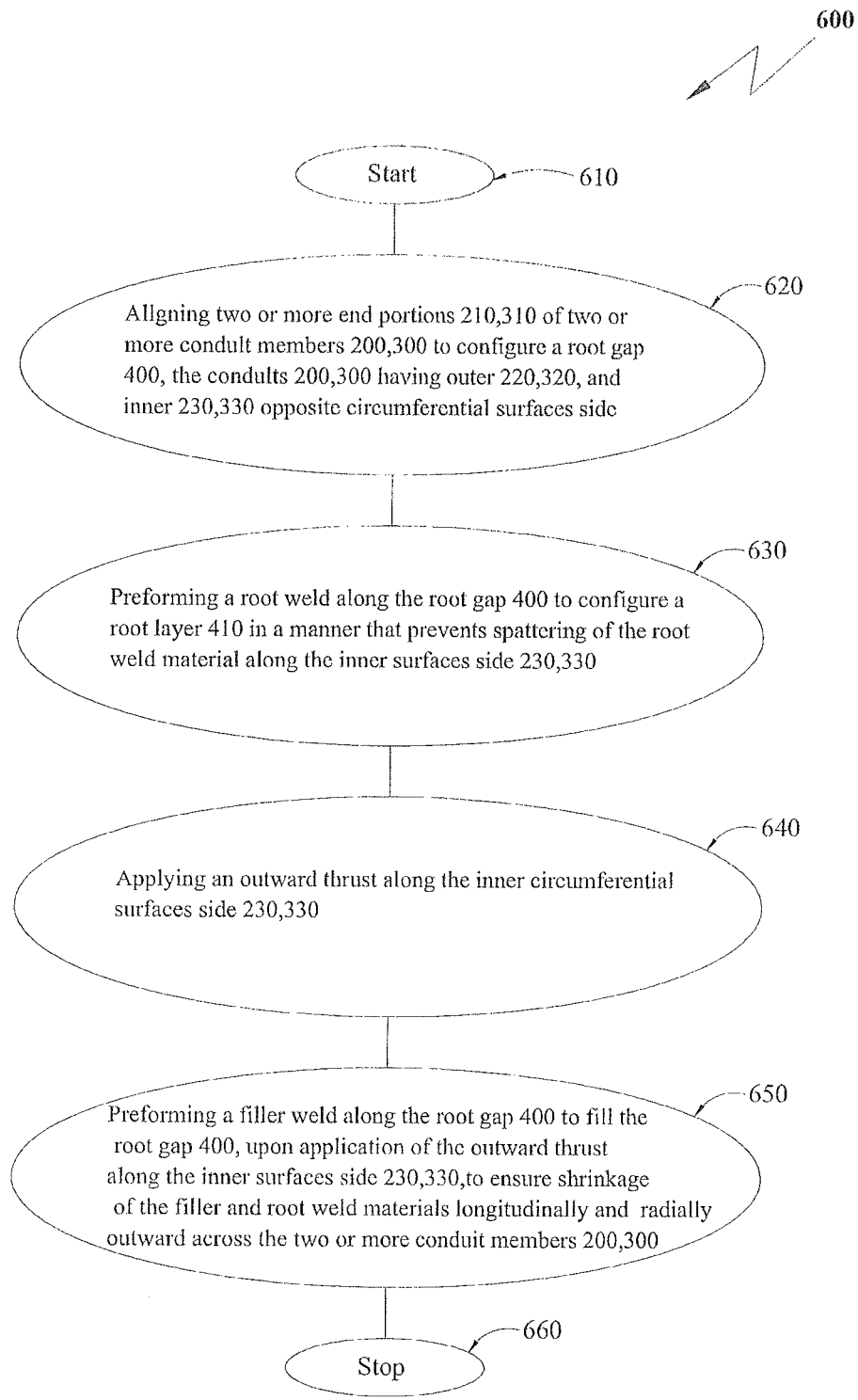
FIG. 3 illustrates a flow chart of a method for welding the two or more conduits, in accordance with an exemplary embodiment of the present disclosure.

Referring now to FIG. 3, a flow chart of a method 600 for welding the two or more conduits, such as the conduits 200, 300, in accordance with an exemplary embodiment of the present disclosure is illustrated. The method 600 will be described herein in conjunction with the system 100 as shown in FIGS. 1 and 2A to 2O. The method 600 starts at 610. Further at 620, the conduits 200 and 300 are aligned in an abutting relationship at a predetermined distance to define a root gap, such as the root gap 400, as explained above. In one embodiment of the present disclosure, the conduits' end portions 210, 310 may be prepared by chamfering in opposite directions to complement each other, prior to aligning the conduits 200 and 300, as explained herein above, and excluded herein for the sake of brevity.

At 630, a root weld along the root gap 400 from outer circumferential surfaces side, such as the outer surfaces side 220, 320, is performed to configure a root layer, such as the root layer 410, by utilizing a root welding tool, such as the root welding tool 110, as explained above and excluded herein for the sake of brevity. The root weld is performed in such a manner that prevents spattering of the root weld material along the inner circumferential surfaces side, such as the inner surfaces side 230, 330.

At 640, an outward thrust along the inner surfaces side 230, 330 is applied.

Furthermore at 650, filler weld of the gap 400, above the root layer 410, from the outer surfaces side 220, 320, of the conduits 200, 300 to fill the gap 400 is performed by utilizing a welding tool, such as the filler welding tool 120, as explained above and excluded herein for the sake of brevity.

In one form, the support member 130 may be inserted within the conduit 200, 300 and applies the outward thrust, prior to performing the filler welding process, i.e. after the root weld is finished. In other form, the support member 130 may also be inserted within the conduit 200, 300 and apply the outward thrust simultaneously while performing the filler welding process, without departing from the scope of the present disclosure.

The outward thrust along the inner surfaces side 230, 330 is applied to ensure shrinkage of the weld materials, such as such as the root weld or filler weld materials, longitudinally and radially outward, across the conduits 200, 300. In turn, this prevents pressing out of the filler and root weld materials along the inner circumferential surfaces side 230, 330, while performing the filler weld, and until solidifying of the weld materials. In one embodiment of the present disclosure, the outward thrust is provided by utilizing a support member, such as the support member 130, along the inner surfaces side 230, 330, and actuating the support member 130 to expand diametrically along the inner surfaces side 230, 330. The detailed explanation thereof is excluded herein for the sake of brevity.

In one embodiment of the present disclosure, the support member 130 may include an actuating arrangement, such as the actuating arrangement 132, and an releasing arrangement, such as the releasing arrangement 134, configured in conjunction to each other and with the support member 130 for enabling the application of the outward thrust, and releasing thereof. The same has been explained herein above and excluded herein for the sake of brevity. The method 600 stops at 660.

The system 100 and the method 600 of the present disclosure offer following advantages. The system and method are capable providing time effective, economic and handy ways for preventing deposition or pressing out of weld material in and around welding zone of the two or more conduit's inner surfaces while welding. Specifically, the support member of the present disclosure is provided to prevent the deposition or pressing out of the weld materials which in turn precludes the requirement of machining. The support member is provided along the inner circumferential surfaces side for applying the outward thrust therealong to ensure shrinkage of the filler and root weld materials longitudinally and radially outward, across the two or more conduit members. This prevents deposition or pressing out of the weld materials along the inner circumferential surfaces while performing the filler weld. Further, the outward thrusts provided by the support member also manage to ensure the stress development across the two or more conduit members in longitudinally and radially outward direction. This enables the durability of the weld and prevents any type of cracking in the weld while and after its formation.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the cover the application or implementation without departing from the spirit or scope of the claims of the present disclosure.

What is claimed is:

1. A method for welding two or more conduit members, the method comprising:
    aligning two or more end portions of the two or more conduit members in an abutting relationship to define a gap, the end portions being chamfered in opposite directions to complement each other, the conduit members having an outer circumferential surface side and an inner circumferential surface side and the gap extending from the outer circumferential surface side through the inner circumferential surface side into an interior area of the conduit members:
    having the inner circumferential surface side exposed to the interior area of the conduit members;
    performing a root weld along the gap from the outer circumferential surface side to configure a root layer while the inner circumferential surface side is exposed to the interior area of the conduit members, the chamfered end portions maintaining any spatter of the root weld material within the gap or on the outer circumferential surface side of the conduit members;
    after the root weld is complete, inserting a support member into the interior area of the conduit members for applying an outward thrust along the inner circumferential surface side and root weld, the support member providing a reactive force in a magnitude of about 100 bars to about 500 bars to oppose inward plastic deformation of the root weld: and
    during application of the outward thrust, performing a filler weld along the gap from the outer circumferential surface side thereof to fill the gap so as to facilitate shrinkage of the filler and root weld materials longitudinally and radially outwardly.

2. The method for welding the two or more conduit members as claimed in claim 1, further comprising preparing edges of the two or more end portions of the two or more conduit members for performing the root weld.

3. The method for welding the two or more conduit members as claimed in claim 1, wherein applying the outward thrust further comprises
    actuating the support member to expand diametrically along the inner circumferential surface side of the two or more conduits for applying the outward thrust.

4. The method for welding the two or more conduit members as claimed in claim 3, wherein actuating the support member by one of a hydraulically, a pneumatically, a mechanically or a thermally actuating arrangement.

5. The method for welding the two or more conduit members as claimed in claim 1, further comprising releasing the outward thrust upon solidifying of the filler and root weld materials.

6. The method for welding the two or more conduit members as claimed in claim 5, wherein releasing the outward thrust by one of a hydraulically, a pneumatically, a mechanically or a thermally releasing arrangement.

7. The method for welding the two or more conduit members as claimed in claim 1, wherein the applying an outward thrust along the inner circumferential surface side is done simultaneously with the performing the filler weld.

8. The method for welding the two or more conduit members as claimed in claim 3, wherein the inserting the support member is done simultaneously with the performing the filler weld.

9. The method for welding the two or more conduit members as claimed in claim 1, wherein the outward thrust is provided across the two or more conduit members.

* * * * *